United States Patent [19]
Johnston et al.

[11] Patent Number: 5,609,401
[45] Date of Patent: Mar. 11, 1997

[54] PROPORTIONAL BRAKING SYSTEM WITH DUAL POPPET VALVES

[75] Inventors: Gary L. Johnston, Pleasant Hill; James W. Zehnder, II, Huber Heights; William C. Kruckemeyer, Beaver Creek; Michael L. Oliver, Xenia; Richard E. Longhouse, Dayton, all of Ohio

[73] Assignee: General Motors Corporation, Detroit, Mich.

[21] Appl. No.: 391,384

[22] Filed: Feb. 21, 1995

[51] Int. Cl.$^6$ ........................................ B60T 8/40
[52] U.S. Cl. .................. 303/155; 303/113.4; 303/114.1; 303/116.2
[58] Field of Search .............................. 303/2, 3, 10, 11, 303/113.4, 114.1, 115.4, 116.1, 116.2, 119.1, 119.2, 155, 401

[56] References Cited

U.S. PATENT DOCUMENTS

| | | | |
|---|---|---|---|
| 4,796,957 | 1/1989 | Wakata et al. | 303/116.1 |
| 5,102,205 | 4/1992 | Stegmaier | 303/113.2 |
| 5,123,716 | 6/1992 | Willmann | 303/119.1 X |
| 5,248,190 | 9/1993 | Sato et al. | 303/113.4 |
| 5,288,142 | 2/1994 | Burgdorf | 303/116.2 X |
| 5,299,858 | 4/1994 | Beck | 303/113.2 |
| 5,333,944 | 8/1994 | Shirai et al. | 303/116.2 X |
| 5,335,981 | 8/1994 | Volz et al. | 303/116.2 X |
| 5,342,120 | 8/1994 | Zimmer et al. | 303/116.2 X |

*Primary Examiner*—Lee W. Young
*Attorney, Agent, or Firm*—Jeffrey A. Sedlar

[57] ABSTRACT

A brake system with a direct connection between the master cylinder and wheel brake through an isolation valve and dual normally closed poppet style control valves provides efficient, proportional and independent wheel control suitable for use in achieving anti-lock braking and traction control braking intervention functions.

9 Claims, 2 Drawing Sheets

PROPORTIONAL BRAKING SYSTEM WITH DUAL POPPET VALVES

BACKGROUND OF THE INVENTION

The present invention relates to vehicle braking systems.

Brake systems incorporating anti-lock braking systems (ABS) and the related traction control brake intervention systems (TC), are conventionally used. ABS is achieved by providing a mechanism for rapidly releasing pressure at a selected wheel brake when incipient wheel slip occurs during vehicle braking. A mechanism for re-applying braking pressure as needed during ABS cycling is also typical. TC is achieved by providing a mechanism for applying braking pressure at a selected heel brake when incipient wheel slip occurs, generally during various forms of vehicle acceleration.

ABS and TC systems generally incorporate a pressure gradient generation mechanism such as a pump to automatically provide appropriate braking pressure apply and release rates. The pump must be capable of effecting rapid pressure changes at the wheel brake and therefore, its fluid flow capacity capabilities are critical. The internal leakage inherent in fluid flow control mechanisms typically used for braking systems increases the capacity that must be designed into the pump. This contributes to system complexity, inefficiency and cost. Accordingly, a more efficient braking system is preferable.

SUMMARY OF THE INVENTION

A braking system is provided that utilizes dual poppet style proportional solenoid valves for wheel brake pressure control between a boosted or unboosted master cylinder and the wheel brake(s). One valve operates for proportionally increasing wheel brake pressure and the other operates for proportionally reducing wheel brake pressure. The two valves provide a pressure control method that requires a relatively small amount of operating fluid flow per braking channel and therefore, requires a relatively small capacity fluid source.

Preferably, there is essentially no internal leakage at the assigned system pressure. This contributes to a highly efficient braking system capable of providing relatively simple proportional control to a braking channel or individual wheel brake in a relatively small package size. The system is adaptable to providing ABS and TC braking capabilities.

DETAILED DESCRIPTION

Figure 1:
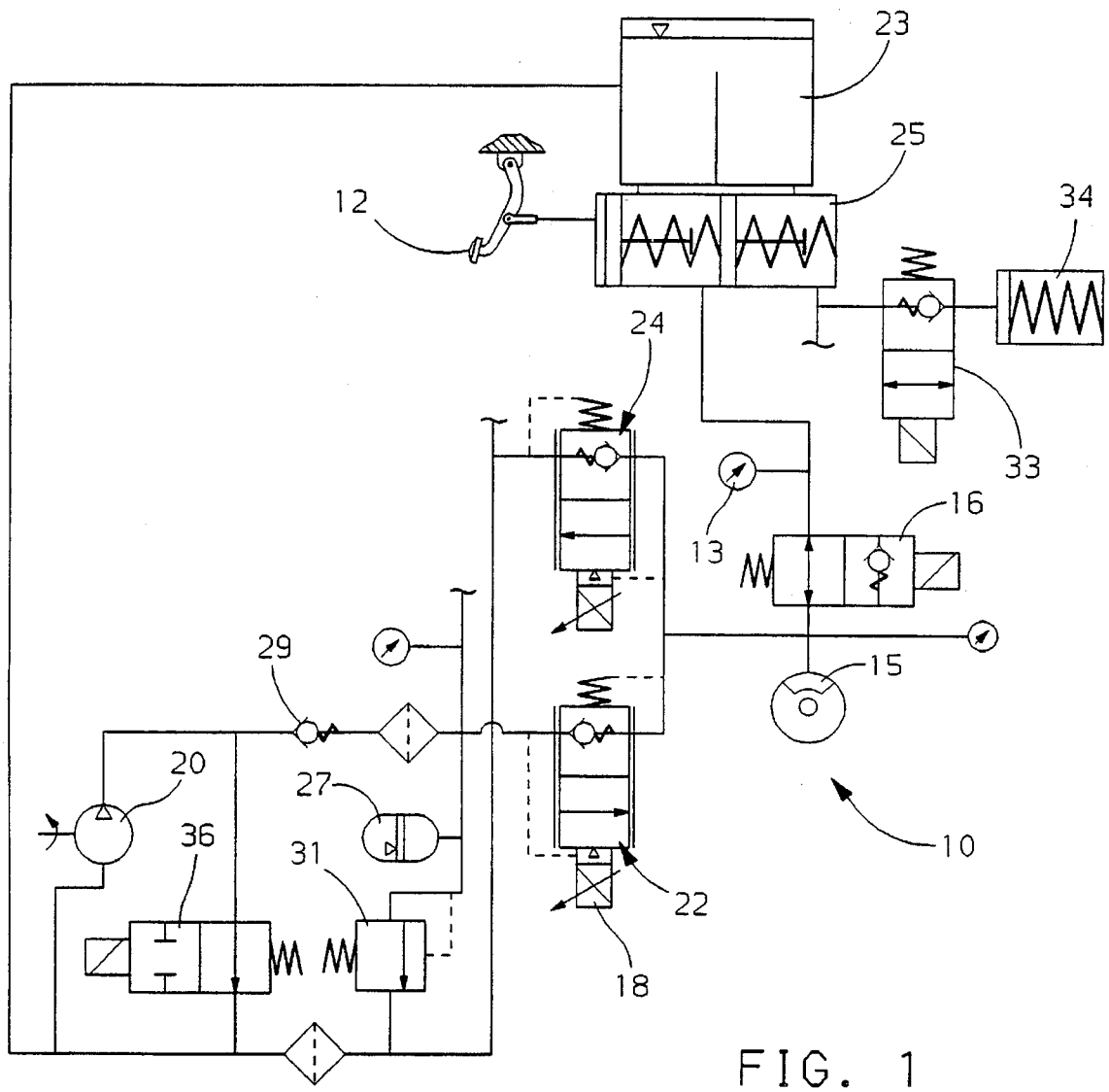
FIG. 1 is a graphical symbol hydraulic diagram of a brake system incorporating features of the present invention.
Figure 3:
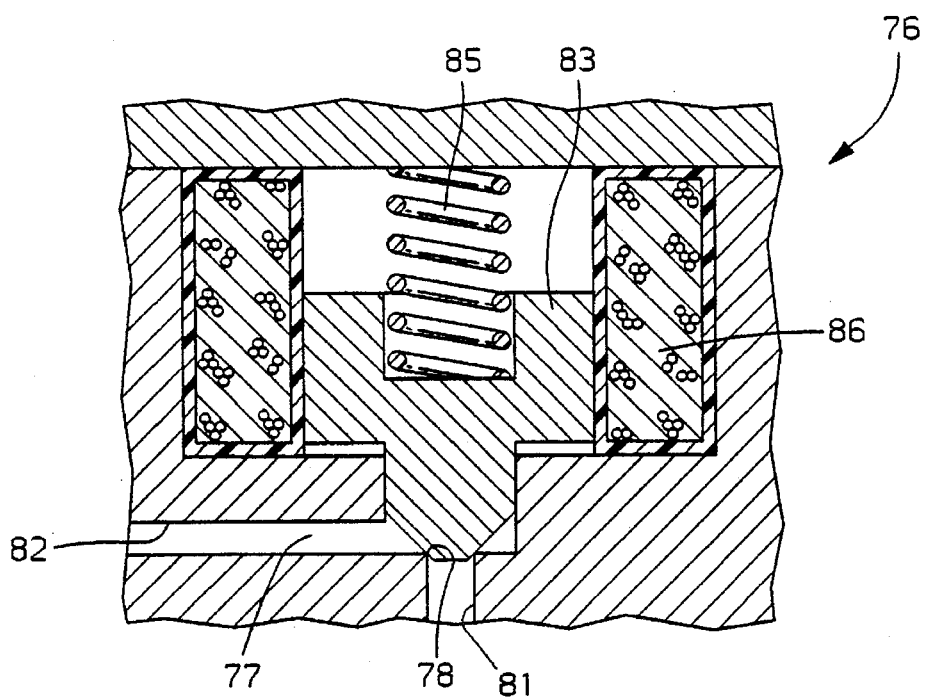
FIG. 3 is a schematic diagram of a poppet valve for use in the braking systems of FIGS. 1 and 2.

FIG. 1 illustrates a braking system 10 that demonstrates the use of dual poppet valves 22 and 24 in providing braking functions. What is meant by a poppet valve is schematically illustrated in FIG. 3 as poppet valve 76. The poppet valve 76 is meant to be a simple device readily constructable by one skilled in the art to provide the operational features of the present invention. The poppet valve may be provided as a normally closed device as illustrated or as a normally open device.

Elements of the poppet valve 76 include a single operative braking flow path 77 between ports 81 and 82, which extends through the valve seat 78. A popper 83 is normally biased by spring 85 to a closed position upon valve seat 78. In this normally closed position, poppet valve 76 is configured as a check valve. Flow is effectively, normally obstructed between port 82 and port 81. Flow could be permitted from port 81 to port 82 when the fluid pressure at port 81 effects a force on an area of poppet 83 at the valve seat 78 greater than the force applied to poppet 83 by spring 85. However, the poppet valve includes internal pressure equalization through a flow path illustrated diagrammatically in FIGS. 1 and 2 such that in the normally closed position the internally imposed force of spring 85 balances the normal inlet pressure at the valve seat 78 and the poppet valve 76 will remain closed. The spring force and the internal pressure equalization mechanism are such that pressure generated by the unboosted master cylinder is never sufficient, by itself, to open the valve. Solenoid coil 86 provides a mechanism for selectively moving popper 83 off valve seat 78 to open the flow path 77.

This conventional type valve is adaptable to conventional electronic control schemes such to provide effective opening amounts permitting flow rates equating to preferred pressure gradient effects. Such control includes effecting a flow rate proportional to the input control signal, as is conventionally known, which is utilized to effect a desired downstream pressure.

The braking circuit of FIG. 1 utilizes poppet valves 22 and 24 both of which are normally closed. Normal braking operation of the system 10 is selected by the manual application of force to the brake pedal actuator 12. The application of force is sensed by pressure transducer 13 which is in communication with a conventionally known electronic controller (ECU), (not illustrated). In response, the ECU effects energization of the solenoid 18, opening valve 22. Valve 22 is cycled open to effect a braking pressure proportional to the input signal which is delivered by the ECU in relation to the amount of force applied to brake pedal actuator 12. To apply pressure to the wheel brake 15 only valve 22 is opened. The valve provides the selected pressure at wheel brake 15, substantially without overshoot.

Valve 24 remains closed until the amount of force applied to brake pedal actuator 12 is reduced. As the applied force is reduced, the ECU signals valve 24 to open releasing pressure from the wheel brake 15. Valves 22 and 24 are cycled in concert to effect the desired pressure at wheel brake 15 as selected by the manual application of force to brake pedal actuator 12.

The normal braking pressure is supplied by pump 20. When braking is selected, isolation valve 16 is shifted. Isolation valve 16 has two positions. The first position provides a normally open flow path between master cylinder 25 and wheel brake 15. When energized, isolation valve 16 is shifted to the second position wherein a check valve is provided between master cylinder 25 and wheel brake 15. In the second position fluid flow from wheel brake 15 to master cylinder 25 is obstructed. The fluid pressure at wheel brake 15 during braking will normally always be higher than the pressure at master cylinder 25. Therefore, during braking the check of isolation valve 16 will open and permit flow from master cylinder 25 to wheel brake 15 only when an abnormally low pressure occurs at wheel brake 15. After a braking cycle is completed isolation valve 16 is deenergized and shifts to the open position permitting the return of any residual braking pressure to master cylinder 25.

The braking power unit includes pump 20 which is power driven and operates to maintain a predetermined pressure level in accumulator 27. The charged system is capable of providing sufficient fluid pressure to assist in two braking stops. The accumulated pressure is trapped between check 29 and pressure regulator 31 and is available at valve 22. Pressure charging valve 36 operates to maintain the pressure in the preferred range at approximately 2500 psi allowing the pump to continuously run during significant braking cycles.

Isolation valve 33 provides a flow path to artificial pedal feel device 34 during powered braking. Artificial pedal feel device 34 emulates a preselected pedal feel characteristic at brake pedal actuator 12. In the absence of power braking pressure the internal check of isolation valve 33 prevents the flow of fluid from master cylinder 25 to artificial pedal feel device 34.

Braking system 10 is capable of providing ABS and TC functions. During braking operation, proportionally equal pressure is applied wheel-to-wheel such that braking pressure is limited below that required to reach incipient wheel slip conditions. When variable coefficient of friction road surfaces are encountered, the ABS mode of operation is engaged when a predetermined amount of wheel slip is detected during braking operation such that the ECU determines corrective action of brake pressure regulation is necessary. During braking, pump 20 will be running and therefore, available for employment in providing ABS functions. When ABS regulation of wheel brake 15 is required, normally closed valve 24 is energized and thereby, opened. In coordination, valve 22 is closed. Therefore, fluid pressure at wheel brake 15 is released proportionally through valve 24 and returned to pump 20 for storage in accumulator 27 or return to reservoir 23. Reapplication of braking pressure is effected as required through valve 22. Valves 22 and 24 are cycled accordingly to control fluid pressure while inhibiting premature lock-up of wheel brake 15.

The TC mode of operation is engaged when a predetermined amount of wheel slip is detected during various types of vehicle acceleration and the ECU determines that TC braking intervention is required. Pump 20 is immediately turned on to supplement the system pressure available for braking operation. Isolation valve 16 is closed to prevent fluid flow to master cylinder 25. Valve 22 is opened to effect a pressure level at wheel brake 15 as necessary to correct the incipient slip condition. As slip is suppressed pressure is released through valve 24. Valves 22 and 24 are cycled accordingly to control fluid pressure while inhibiting slip of the wheel (not illustrated), associated with wheel brake 15.

Figure 2:
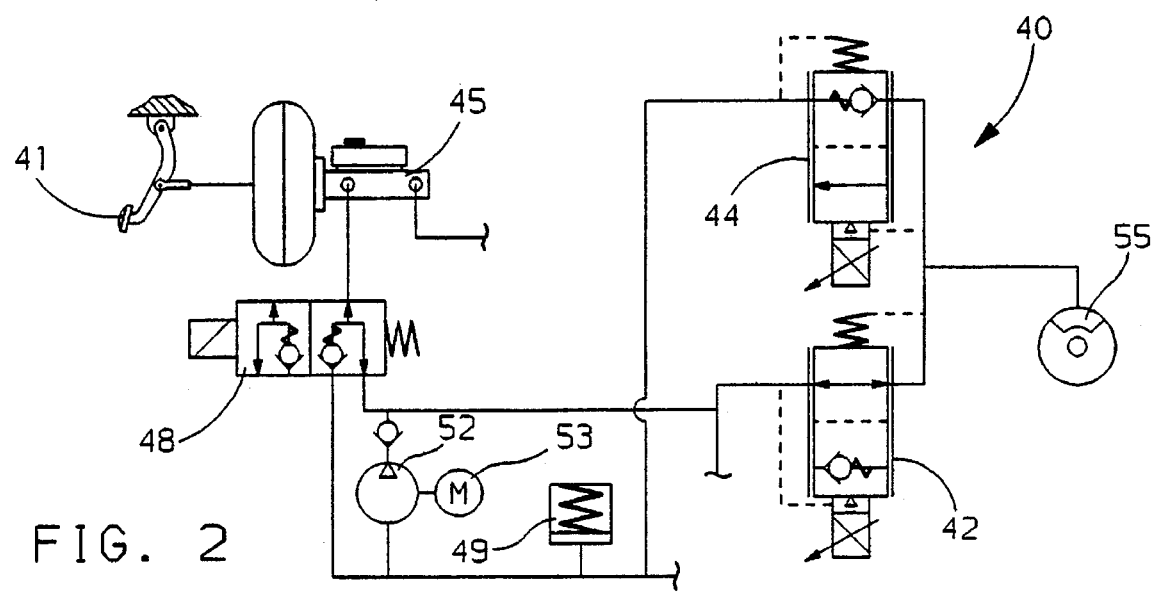
FIG. 2 is a graphical symbol hydraulic diagram of a brake system incorporating features of the present invention.

Referring to FIG. 2, an alternative braking system 40 utilizing dual poppet style valves 42 and 44 is illustrated. Valve 42 is normally open and valve 44 is normally closed. Normal braking operation of the system 40 is initiated by the application of manual force to brake pedal actuator 41. The force applied is amplified by power boosted master cylinder 45. A normally open flow route exists from master cylinder 45 to wheel brake 55. Therefore, the pressure at wheel brake 55 is a function of the pressure effected by master cylinder 45. For normal braking operation valves 42 and 44 along with selector valve 48 remain in their normal positions. Electric motor driven pump 52 remains off.

Braking system 40 is capable of providing ABS and TC functions. During braking operation, proportionally equal pressure is applied wheel-to-wheel such that braking pressure is limited below that required to reach incipient wheel slip conditions. When variable coefficient of friction road surfaces are encountered, the ABS mode of operation is engaged when a predetermined amount of wheel slip is detected during braking operation such that the ECU determines corrective action of brake pressure regulation is necessary. Operation of pump 52 is immediately initiated by turning on motor 53. Selector valve 48 is energized and shifted to a second position wherein the inlet side of pump 52 is in communication with master cylinder 45. An internal check is provided in selector valve 48 to obstruct the flow of fluid from the outlet of pump 52 to master cylinder 45. The check's spring force in combination with the relatively small open seat area maintain the check in a closed condition preferably well above 2000 psi system pressure.

To effect an ABS release of pressure from the wheel brake 55, valve 42 is closed and valve 44 is opened. Therefore, fluid pressure at wheel brake 55 is released through valve 44 and momentarily allowed to collect in accumulator 49 for return to the inlet of pump 52 or master cylinder 45. Reapplication of braking pressure is effected, as required, through valve 42. Valves 42 and 44 are cycled accordingly, to control fluid pressure while inhibiting premature lock-up of wheel brake 55. Upon cessation of the ABS situation, the valves 42, 44 and 48 are returned to their normal positions, pump 52 is turned off and normal braking is resumed.

The TC mode of operation for system 40 is engaged when a predetermined amount of wheel slip is detected during various types of vehicle acceleration and the ECU determines that TC braking intervention is required. Pump 52 is immediately turned on. Selector valve 48 is energized to prevent pump output from flowing to master cylinder 45 and to supply fluid from master cylinder 45 to pump 52.

TC braking pressure is applied to wheel brake 55 through valve 42. Valve 42 is modulated to provide the appropriate braking pressure to inhibit wheel slip. Excess braking pressure during the TC mode of operation is released through valve 44 to accumulator 49. Upon cessation of the TC situation, pump 52 is turned off and the valves 42, 44 and 48 are returned to their normal positions.

By way of example systems 10 and 40 demonstrate the applicability of dual poppet valve control to braking systems. It has been found that pressure effected at the wheel brake by means of dual poppet valve control is attainable within two-percent error of the target pressure. This provides the option of setting the output pressure solely with the apply valve.

The dual poppet valve control mechanism provides proportional and independent ABS and TC capability in each wheel channel. This control mechanism is adaptable to single or multiple channel braking systems with or without pedal isolation.

What is claimed is:

1. A brake system comprising:

a master cylinder capable of actuation;

a wheel brake responsive to an application of fluid pressure;

a hydraulic circuit interconnecting the wheel brake with the master cylinder;

an isolation valve capable of isolating the master cylinder from the wheel brake interconnected in the hydraulic circuit such that a normally open connection is provided between the master cylinder and the wheel brake through the isolation valve;

a pump having an inlet and an outlet interconnected in the hydraulic circuit;

a first poppet valve having a single operative braking flow path interconnected in the hydraulic circuit between the wheel brake and the pump outlet; and a second poppet valve having a single operative braking flow path interconnected in the hydraulic circuit between the wheel brake and the pump inlet including a valve seat and a poppet biased toward the valve seat by a spring and providing a pressure release from the wheel brake to the pump inlet through the valve seat wherein fluid pressure is applied to the wheel brake from the pump in response to and proportional to an input pressure resulting from the actuation of the master cylinder solely by operation of the first poppet valve while the second poppet valve remains closed setting the application of fluid pressure to which the wheel brake is responsive.

2. A brake system according to claim 1 wherein the first and second poppet valves are both normally closed.

3. A brake system according to claim 1 wherein the first and second poppet valves are internally pressure equalized preventing flow through the single operative braking flow paths from the wheel brake to the pump when both valves are closed.

4. A brake system according to claim 1 wherein the first poppet valve is normally closed and the second poppet valve is normally open.

5. A brake system according to claim 1 wherein the isolation valve has first and second positions wherein in the first position the isolation valve establishes communication between the master cylinder and the wheel brake and in the second position the isolation valve establishes communication between the master cylinder and the pump inlet.

6. A brake system comprising:

a master cylinder;

a wheel brake;

a hydraulic circuit interconnecting the wheel brake with the master cylinder;

an isolation valve interconnected in the hydraulic circuit between the master cylinder and the wheel brake selectively isolating the master cylinder from the wheel brake such that a normally open direct connection is provided between the master cylinder and the wheel brake through the isolation valve;

a pressure transducer connected in the hydraulic circuit between the master cylinder and the isolation valve effecting a pressure signal;

a pump having an inlet and an outlet interconnected in the hydraulic circuit;

a first poppet valve having a single one-way operative braking flow path interconnected in the hydraulic circuit between the wheel brake and the pump outlet; and a second poppet valve having a single one-way operative braking flow path interconnected in the hydraulic circuit between the wheel brake and the pump inlet;

wherein the pump generates a fluid pressure in the hydraulic circuit and wherein the wheel brake is applied, the isolation valve is closed, the first poppet valve is opened and the second poppet valve remains in a normally closed position so that the fluid pressure generated by the pump is communicated through the first poppet valve to the wheel brake effecting a braking pressure at the wheel brake proportional to the pressure signal during base braking operation of the brake system and also in response to an incipient wheel slip condition during a traction control operation of the brake system.

7. A brake system according to claim 6 further comprising an accumulator interconnected in the pressure side of the hydraulic circuit in communication with the pump outlet.

8. A brake system according to claim 6 further comprising an accumulator interconnected in the hydraulic circuit in communication with the pump inlet.

9. A brake system operable through manual actuation and by automatic control to provide base brake, anti-lock and traction control functions comprising:

a master cylinder capable of actuation;

a wheel brake responsive to an application of fluid pressure;

a hydraulic circuit interconnecting the wheel brake and the master cylinder;

a normally open isolation valve with an integral check connected in the hydraulic circuit between the master cylinder and the wheel brake providing a selectively closable direct connection between the master cylinder and the wheel brake through the isolation valve;

an artificial pedal feel device connected in the hydraulic circuit with the master cylinder;

a normally closed isolation valve connected in the hydraulic circuit between the master cylinder and the artificial pedal feel device;

a power unit connected in the hydraulic circuit with the wheel brake including:

an accumulator connected in the power unit, a pump having an inlet and an outlet operable to establish a predetermined fluid pressure level in the accumulator, a one-way check connected in the power unit between the pump outlet and the accumulator so that the fluid pressure in the accumulator is closed off from the pump outlet, a pressure regulator connected in the power unit between the accumulator and the pump inlet maintaining the predetermined fluid pressure level in the accumulator, and a pressure charging valve connected in the power unit between the pump outlet and the pump inlet in parallel with the accumulator;

an internally pressure balanced normally closed first poppet valve connected in the hydraulic circuit between the power unit and the wheel brake such that the accumulator is directly connected to the first poppet valve and the pump is connected to the first poppet valve through the one-way check;

an internally pressure balanced normally closed second poppet valve connected in the hydraulic circuit between the power unit and the wheel brake such that the second poppet valve is directly connected to the pump inlet;

wherein fluid pressure is applied to the wheel brake from the pump and the accumulator in response to and proportional to a signal generated by a transducer in response to actuation of the master cylinder by opening the first puppet valve and also in response to automatic control by closing the normally open isolation valve and opening the first poppet valve while the second poppet valve remains closed in operation of the base brake, anti-lock and traction control functions;

wherein fluid pressure is released from the wheel brake by opening the second poppet valve in response to a change in the actuation of the master cylinder and in response to automatic control in operation of the base brake, anti-lock and traction control functions;

wherein when both the first and the second poppet valves are closed fluid flow is prevented between the power unit and the wheel brake.

* * * * *